United States Patent [19]
Liebig

[11] 3,717,351
[45] Feb. 20, 1973

[54] SEAL
[75] Inventor: Joseph M. Liebig, Wheaton, Ill.
[73] Assignee: Microdt Inc.
[22] Filed: April 19, 1971
[21] Appl. No.: 135,298

[52] U.S. Cl. ................................. 277/185, 277/199
[51] Int. Cl. ........................................... F16j 15/00
[58] Field of Search......277/199, 181, 185, 183, 193, 277/227, 233, 153; 156/73

[56] References Cited

UNITED STATES PATENTS

| 3,601,417 | 8/1971 | Szepesvary | 277/181 X |
| 3,362,719 | 1/1968 | McCormick | 277/153 X |
| 3,462,803 | 8/1969 | Horton | 156/73 X |
| 3,123,367 | 3/1964 | Brummer et al. | 277/171 |
| 2,616,735 | 11/1952 | Walker | 277/185 |
| 3,480,286 | 11/1969 | Kosatka | 237/182 |

*Primary Examiner*—Samuel B. Rothberg
*Attorney*—Harness, Dickey & Pierce

[57] ABSTRACT

An annular seal for a shaft is built up in sandwich form comprising a central washer-like sealing element and a pair of rigid side wall elements on opposite sides thereof. The side wall elements on their radially inner edge have parallel sloping surfaces which deflect the inner edge portion of the sealing element to form a lip for sealing a shaft. The sealing element extends beyond the radially outer edge of the side wall elements to form a seal with the base of a groove in which the sealing unit is supported.

5 Claims, 4 Drawing Figures

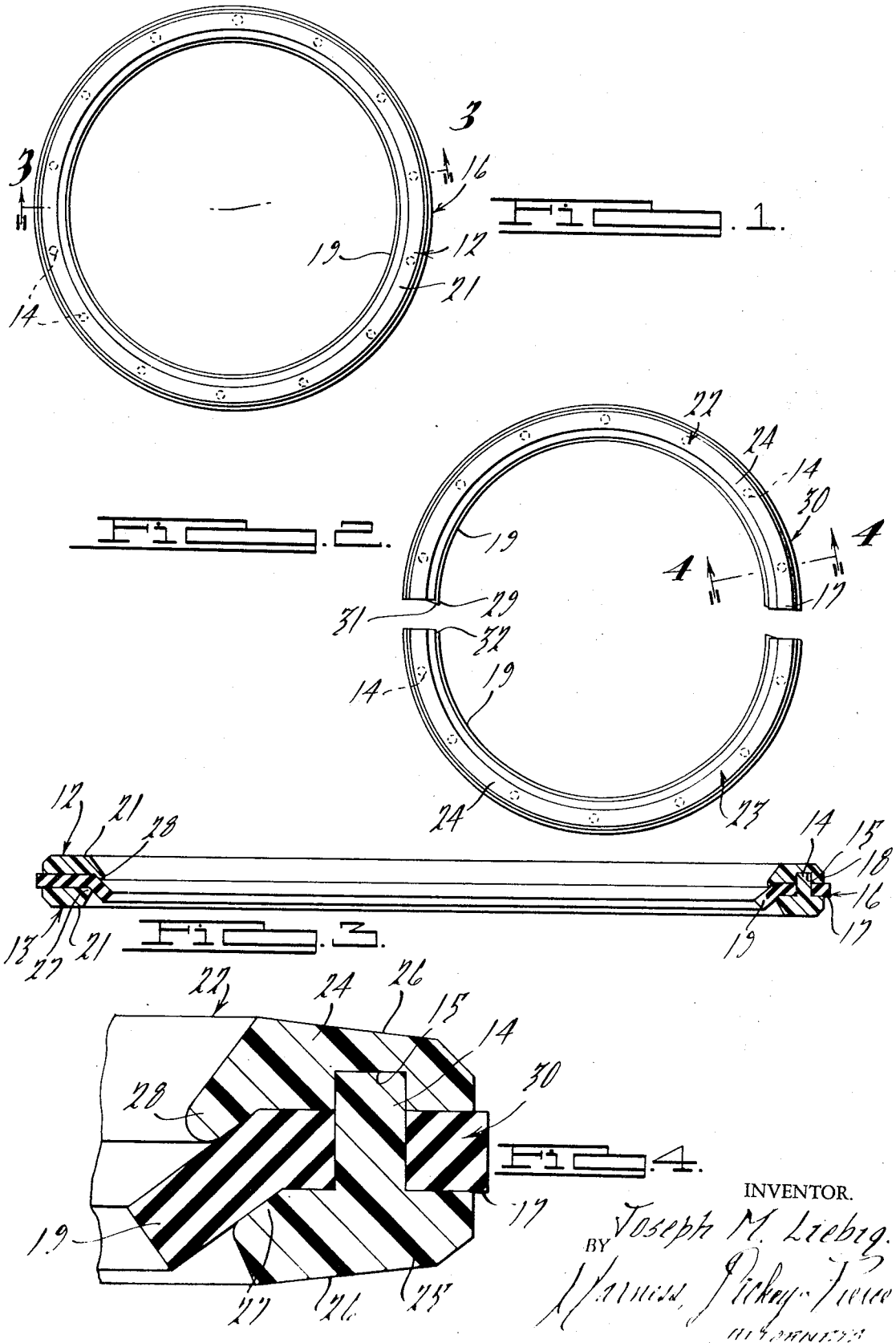

SEAL

BACKGROUND OF THE INVENTION

Reference may be had to applicant's U.S. Pat. No. 3,106,406 and the art cited therein for a disclosure of the pertinent prior art.

SUMMARY OF THE INVENTION

The seal of the present invention has a central inner deflected lip portion which seals a shaft and an outwardly extending sealing portion which seals the outer edge of the seal against a supporting surface. The seal may be a ring for sealing a shaft or be made in two halves for sealing a journal of a crankshaft bearing. The halves are mounted in semi-annular grooves in the bearing support and are sealed to the base thereof and at the abutting edges by having the sealing lip portion of the sealing element at the abutting edges extended and recessed respectively at different angles. The seal is composed of two side wall elements and a central flat washer-like sealing element which forms a sandwich when the two side wall elements are pressed against the central sealing element with sufficient force to deflect the inner sealing lip portion thereof.

To produce this deflection, the inner edge of the outer wall element slopes outwardly while a lip is extended outwardly from the inner end of the inner wall element. The outer wall element is provided with a plurality of spaced extending pins which align with recesses in the adjacent face of the inner wall element. The sealing element has apertures which permit it to be assembled on the pins after which the recesses in the inner wall element are forced downwardly on the pins with sufficient pressure to deflect the inner edge portion of the sealing element and form the sealing lip which projects toward the oil containing side of the assembly. The width of the washer is such that a portion thereof extends beyond the outer edge of the wall elements so as to form a seal with the bottom of the groove in which it is supported. The three elements are retained in firm fixed relation to each other by sonic welding the ends of the pins in the recesses in the inner wall element while a predetermined pressure is applied to the wall elements.

BRIEF DESCRIPTION OF THE DRAWING

FIG. 1 is a plan view of a sealing element embodying features of the present invention:

FIG. 2 is a view of structure, similar to that illustrated in FIG. 1, showing the sealing element made in two parts;

FIG. 3 is an enlarged sectional view of the structure illustrated in FIG. 1, taken on the line 3—3 thereof, and FIG. 4 is an enlarged broken sectional view of the structure illustrated in FIG. 2, taken on the line 4—4 thereof.

DESCRIPTION OF THE PREFERRED EMBODIMENT

Referring to FIGS. 1 and 3, an annular seal 11 has an inner wall element 12 and an outer wall element 13 both of which are made from a plastic material which may be thermoplastic or thermosetting. The outer wall element 13 has a plurality of spaced projecting pins 14 which are aligned with recesses 15 in the inner wall element 12. A flat sealing element 16 is preferably lathe cut from a tube of suitable plastic material such as nitrile, silicone, polyacrylate, fluroelastomer and the like. The washer-like sealing element is of greater width than the width of the inner and outer wall elements so as to have a portion 17 extend beyond the outer diameter 18 of the seal and an inner portion 19 extending beyond the inner diameter of the wall elements to form the sealing lip. As illustrated more specifically in FIG. 3, the side surfaces 21 of the seal is herein illustrated as being parallel to be secured against a supporting shoulder by a supporting element.

In FIG. 2, the sealing element is shown as being made in two halves 22 and 23 of substantially the same construction as the seal of FIG. 1. Each half has an inner wall element 24 and an outer wall element 25. In this arrangement, the outer surfaces 26 of the wall elements are in converging relation toward the outer edge following the slope of a groove in which the two halves are to be supported. The two wall elements are preferably made of a suitable plastic material with the spaced pins 14 extending from the outer wall element 25 and the recesses 15 provided in the inner wall element 24 in alignment with the pins. A sealing element 30 has an outwardly extending portion 17 which seals the outer edge of the seal assembly and an inwardly extending lip portion 19 at the inner edges of the wall elements 24 and 25. The outer wall element 25 has a downwardly sloping edge 27 and the inner wall element 24 has a downwardly sloping lip 28. When the two wall elements 12 and 13 or 24 and 25 have the sealing element 16 or 30 placed over the pins 14, the two wall elements are then pressed together to have the pins 14 extend within the recesses 15 and the lip portion 19 deflected outwardly between the sloping edge 27 and the downwardly sloping lip 28.

The sealing lip 19 is deflected toward the side of the assembly toward the area in which the oil is present to produce a seal with a shaft or journal with which the sealing lip 19 is engaged. The wall and sealing elements are retained in sandwiched relation, with the sealing lip 19 deflected, by the pins on one wall element extending within the recesses in the other wall element and secured together by a sonic weld.

The lip portion 19 of the sealing element has a projecting tongue 29 produced by having the lip edge 31 slope outwardly at an angle of approximately 14°. The mating edge of the lip portion 19 on the adjacent sealing element 23 is recessed by having the lip edge 32 slope inwardly at an angle of approximately 6°. This produces a pressure engagement of the lip portions at the mating edges 31 and 32 which forms a seal as described in the above mentioned patent.

The seal of the present invention is unique in being made from three parts, the flat sealing washer-like element and the two substantially flat side wall elements which are so constructed as to deflect the inner extending portion of the flat sealing element outwardly into a sloping sealing lip when the three elements are secured together under pressure to form the unit seal.

I claim:

1. A seal comprising a pair of flat side wall rigid elements, a flat elastomeric sealing element supported between said side wall elements and extending radially from one edge across said elements and beyond the other edge so as to present oppositely extending sealing edges, and means for securing said sealing element between said side wall elements which are spaced from each other thereby, the inner edge portion of the side wall elements slope in the same direction axially for deflecting the extending inner edge of the sealing element out of the plane thereof to form a pointed sealing lip which provides line engagement with a shaft sealed thereby.

2. A seal as recited in claim 1, wherein said securing means comprises a plurality of pins secured to and extending from the inner face of one of said wall elements in alignment with recesses in the other wall element, and wherein the sealing element has apertures through which said pins extend when sandwiched between said wall elements.

3. A seal as recited in claim 2. wherein said flat side wall and sealing elements are substantially the same thickness and are circular in form to permit a shaft to extend therethrough and be sealed by the inner sealing lip thereof the deflection of which provides a line contact with the shaft.

4. A seal as recited in claim 2, wherein said side wall and sealing elements are substantially the same thickness and are semi-circular in form for sealing a journal of a crankshaft when disposed in a groove in the supporting members therefor, the deflection of the extending inner edge of the sealing element providing a line contact with the shaft.

5. A seal as recited in claim 2, wherein means are provided for securing the ends of the pins within the recesses for securely locking the three elements in sandwiched relation.

* * * * *